(12) United States Patent
Wong et al.

(10) Patent No.: US 8,967,547 B2
(45) Date of Patent: Mar. 3, 2015

(54) SPACECRAFT EAST-WEST RADIATOR ASSEMBLY

(71) Applicant: Lockheed Martin Corporation, Bethesda, MD (US)

(72) Inventors: Hamilton Wong, Yardley, PA (US); Neil E. Goodzeit, Princeton, NJ (US); Rok Park Buckley, Philadelphia, PA (US); David J. Hentosh, Yardley, PA (US)

(73) Assignee: Lockheed Martin Corporation, Bethesda, MD (US)

( * ) Notice: Subject to any disclaimer, the term of this patent is extended or adjusted under 35 U.S.C. 154(b) by 59 days.

(21) Appl. No.: 13/765,621

(22) Filed: Feb. 12, 2013

(65) Prior Publication Data

US 2014/0224939 A1 Aug. 14, 2014

(51) Int. Cl.
| | | |
|---|---|---|
| B64G 1/50 | (2006.01) | |
| B64G 1/46 | (2006.01) | |
| B64G 1/58 | (2006.01) | |
| F28D 15/02 | (2006.01) | |
| F28D 15/04 | (2006.01) | |

(52) U.S. Cl.
CPC ............ B64G 1/506 (2013.01); F28D 15/0241 (2013.01); F28D 15/04 (2013.01)
USPC .......... 244/171.8; 244/172.6; 165/41

(58) Field of Classification Search
CPC ............ B64G 1/50; B64G 1/58; B64G 1/503; B64G 1/506
USPC .......... 244/171.8, 158.1, 159.5, 172.6, 172.7; 165/41, 46, 86, 104.21; 126/624, 626, 126/625, 627, 635; 237/69
See application file for complete search history.

(56) References Cited

U.S. PATENT DOCUMENTS

| | | | |
|---|---|---|---|
| 6,003,817 A * | 12/1999 | Basuthakur et al. .......... | 244/164 |
| 6,073,887 A | 6/2000 | Hosick | |
| 6,378,809 B1 * | 4/2002 | Pon ............................ | 244/171.8 |
| 6,439,297 B1 * | 8/2002 | Dunbar et al. ................. | 165/46 |
| 6,478,261 B2 * | 11/2002 | Laraway et al. ............ | 244/172.6 |
| 6,626,231 B2 * | 9/2003 | Cluzet et al. ..................... | 165/41 |
| 6,854,510 B2 * | 2/2005 | Low et al. ........................ | 165/41 |
| 7,118,076 B2 * | 10/2006 | Tjiptahardja et al. ....... | 244/171.8 |
| 2002/0139512 A1 | 10/2002 | Low et al. | |
| 2002/0145082 A1 * | 10/2002 | Bertheux et al. .............. | 244/163 |
| 2011/0247781 A1 * | 10/2011 | Vafai et al. ....................... | 165/46 |

* cited by examiner

*Primary Examiner* — Rob Swiatek
*Assistant Examiner* — Magdalena Topolski
(74) *Attorney, Agent, or Firm* — McDermott Will & Emery LLP

(57) ABSTRACT

A heat transfer assembly can include an equipment panel having an east end and a west end. East and west radiator panels are coupled to the east and west ends, respectively, of the equipment panel. The assembly also includes a plurality of flexible heat pipes each having a first rigid tube thermally coupled to the east radiator panel, a second rigid tube coupled to the equipment panel, a third rigid tube thermally coupled to the west radiator panel, a first flexible tube sealingly coupled between the first and second rigid tubes, and a second flexible tube sealingly coupled between the second and third rigid tubes. The equipment panel is configured to retain one or more equipment modules in thermal contact with the second rigid tube of at least one of the plurality of flexible heat pipes.

19 Claims, 4 Drawing Sheets

SPACECRAFT EAST-WEST RADIATOR ASSEMBLY

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

1. Field

The present invention generally relates to heat-transfer systems and, in particular, to a spacecraft radiator assembly with flexible heat pipes.

2. Description of the Related Art

Spacecraft in a geosynchronous earth orbit (GEO) typically operate such that one side continuously faces toward the ground as the satellite orbits the Earth. Such a satellite will have a north-south axis that, while in orbit, is approximately parallel to the north-south rotational axis of the Earth and an east-west axis that is perpendicular to the north-south axis. As the satellite orbits the Earth, the east and west sides of the spacecraft will alternately face toward the Sun and, twelve hours later, face away from the Sun toward deep space.

As GEO spacecraft are frequently used for communication and observation, the designers must accommodate complex communications payloads with large number of components and high thermal dissipation requirements. For example, a direct-broadcast or broadband spot-beam communications spacecraft may require dissipation of 14 kW or more of heat from the payload electronics. As is well known to those of skill in the art, "fixed" north and south radiator panels provide the most mass-efficient and cost-efficient heat rejection capability, and therefore their area is generally maximized within the constraints imposed by the launch vehicle fairing. However, it is often the case that additional heat rejection capability is required beyond what can be provided by such north and south radiator panels.

One conventional approach to providing additional heat rejection capability is the addition of east and west radiator panels, as shown in the exploded view in FIG. 1 of a conventional spacecraft. Because east and west radiator panels receive direct sun exposure during each orbit, they are less effective than north and south radiator panels and therefore operate at higher average temperatures for an equivalent thermal load. This generally limits the use of east and west radiator panels to equipment such as output multiplexers (OMUXs) that can operate at higher temperatures. In addition, east and west radiator panels tend to undergo large diurnal temperature fluctuations, as the individual panels alternately face the Sun and deep space, and equipment that is thermally coupled to conventional east and west radiator panels may require significant heater power to limit the temperature fluctuations to an acceptable range.

Another drawback of conventional radiator panels is that, once the radiator panel is installed, it becomes difficult to access equipment inside the spacecraft including the equipment that is mounted on the radiator panels themselves. This increases the cost and time required for remove-and-replace operations that may be necessary during integration and test of a conventional spacecraft.

SUMMARY

The present invention generally relates to heat-transfer systems and, in particular, to a spacecraft radiator assembly with flexible heat pipes.

It is desirable to provide an east-west heat transfer assembly (EWHTA) having east and west radiator panels that reduce the average temperature as well as the temperature fluctuations seen with conventional panels. In addition, it is advantageous to provide the ability to mount equipment to be cooled by the east and west radiator panels in a location that is separate from the panels themselves, taking advantage of what is generally wasted volume within the body of the spacecraft. It is also beneficial to provide easier access to internal equipment during spacecraft integration and test while maintaining all thermal system connections.

In certain aspects of the present disclosure, a heat transfer assembly for a spacecraft is disclosed. The assembly includes an equipment panel having an east end and a west end, an east radiator panel coupled to the east end of the equipment panel, and a west radiator panel coupled to the west end of the equipment panel. The assembly also includes a plurality of flexible heat pipes each having a first rigid tube thermally coupled to the east radiator panel, a second rigid tube coupled to the equipment panel, a third rigid tube thermally coupled to the west radiator panel, a first flexible tube sealingly coupled between the first and second rigid tubes, and a second flexible tube sealingly coupled between the second and third rigid tubes. The equipment panel is configured to retain one or more equipment modules in thermal contact with the second rigid tube of at least one of the plurality of flexible heat pipes.

In certain aspects of the present disclosure, a spacecraft is disclosed that has a core structure, an east-west equipment panel having an east end and a west end, an east radiator panel rotatably coupled to the east end of the equipment panel, and a west radiator panel rotatably coupled to the west end of the equipment panel. The spacecraft also has a plurality of flexible heat pipes each comprising a first rigid tube thermally coupled to the east radiator panel, a second rigid tube coupled to the equipment panel, a third rigid tube thermally coupled to the west radiator panel, a first flexible tube sealingly coupled between the first and second rigid tubes; and a second flexible tube sealingly coupled between the second and third rigid tubes. The spacecraft also has one or more equipment modules thermally coupled to the second rigid tube of at least one of the plurality of flexible heat pipes.

In certain aspects of the present disclosure, a method of controlling the temperature of an equipment module on a spacecraft is disclosed. The method includes the step of thermally coupling the equipment module to a flexible heat pipe that comprises a first rigid tube thermally coupled to an east radiator panel disposed on an external east surface of the spacecraft, a second rigid tube thermally coupled to a west radiator panel disposed on an external west surface of the spacecraft, and a third rigid tube coupled to the first and second rigid tubes by first and second flexible tubes, respectively, wherein the equipment module is thermally coupled to the third rigid tube.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

DETAILED DESCRIPTION

The present invention generally relates to heat-transfer systems and, in particular, to a spacecraft radiator assembly with flexible heat pipes.

The following description discloses embodiments of an east-west heat-transfer assembly that is particularly adapted for use on a GEO spacecraft. In certain embodiments, however, the same concepts and construction may be effectively used on other types of spacecraft as well as other applications where radiator panels provide a source of cooling.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be apparent to those skilled in the art that the subject technology may be practiced without these specific details. In some instances, well-known structures and components are shown in block diagram form in order to avoid obscuring the concepts of the subject technology. Like components are labeled with identical element numbers for ease of understanding.

Figure 1:
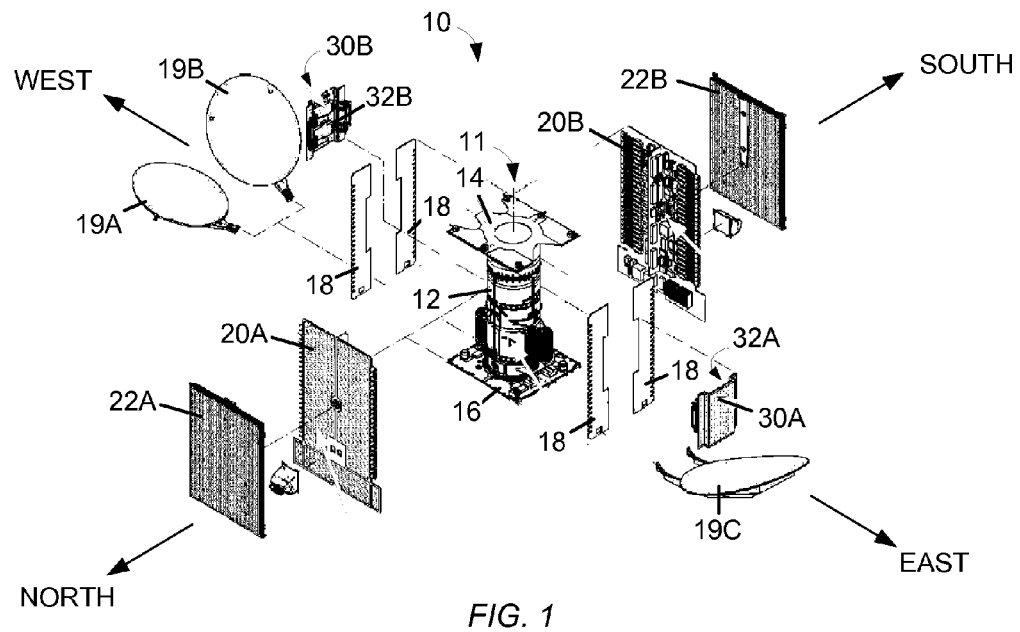
FIG. 1 is an exploded view of a spacecraft equipped with conventional east and west radiator panels.

FIG. 1 is an exploded view of a spacecraft 10 equipped with conventional east and west radiator panels 30A and 30B. The "north", "south," "east," and "west" directions are defined as indicated by the arrows. The spacecraft 10 has a core structure 11 that, in this example, takes the form of a central cylinder 12 with a rectangular "Earth deck" 14 attached to an end that continuously faces toward the ground and a second deck 16 attached to the other end of the cylinder 12. A north radiator panel 22A is attached to a north equipment panel 20A and then to the north side of the core structure 11, and a south radiator panel 22B is attached to a south equipment panel 20B and then to the south side of the core structure 11. Structural panels 18 are attached to the east and west sides of the core structure 11 and fixed east and west radiator panels 30A, 30B are respectively attached to east and west equipment panels 32A, 32B and then attached, in this example, to the structural panels 18. Communication reflectors 19A, 19B, and 19C are deployably attached to the deck 16 such that each reflector established a line of communication toward the Earth. Other spacecraft components and subsystems, such as solar power arrays, have been omitted for clarity.

Figure 2:
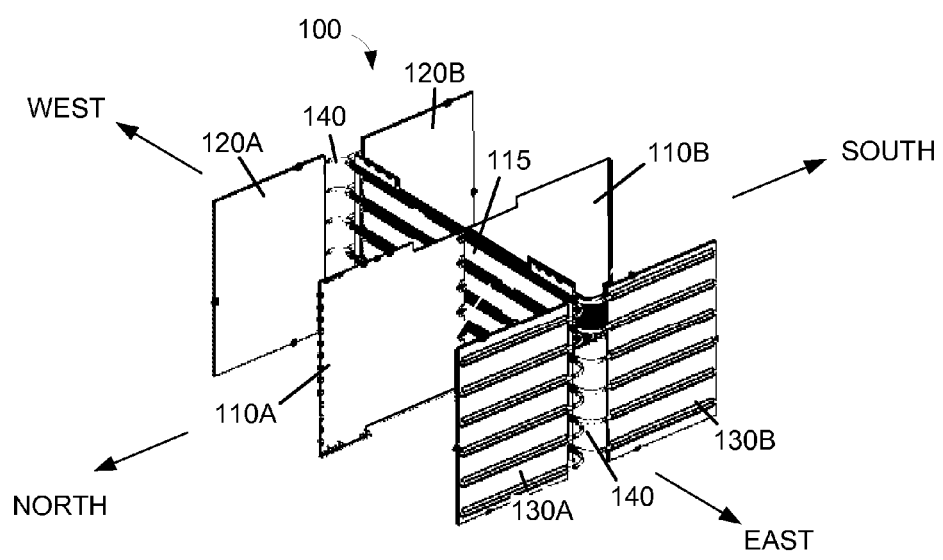
FIG. 2 depicts an exemplary EWHTA according to certain aspects of the present disclosure.

FIG. 2 depicts an exemplary EWHTA 100 according to certain aspects of the present disclosure. The "north", "south," "east," and "west" directions are defined in FIG. 2 as indicated by the arrows to indicate the operational orientation of the EWHTA 100 when installed in a GEO spacecraft (not shown in FIG. 2). The EWHTA 100 includes an equipment panel 115 and, in this example, two east radiator panels 130A, 130B that may also be referred to as the north-east radiator panel 130A and south-west radiator panel 130B. In certain embodiments, the north and south directions, i.e. a north-south axis, may be arbitrarily rotated in a plane that is perpendicular to an east-west axis without departing from the scope of this disclosure. The EWHTA 100 also includes two west radiator panels 120A, 120B. A plurality of flexible heat pipes 140 run from one of the east radiator panels 130A, 130B across the equipment panel 115 to one of the west radiator panels 120A, 120B. The routing of the flexible heat pipes 140 is discussed in greater detail with respect to FIG. 3. The construction of the flexible heat pipes 140 is discussed in greater detail with respect to FIG. 4. Also shown in FIG. 2 are two north-south panels 110A, 110B that, in certain embodiments, are thermally coupled to the equipment panel 115 such that heat absorbed by the north-south panels 110A, 110B, for example from equipment modules thermally coupled to the north-south panels 110A, 110B, may be conducted to the equipment panel 115 and then rejected to one of the east or west radiator panels.

Figure 3:
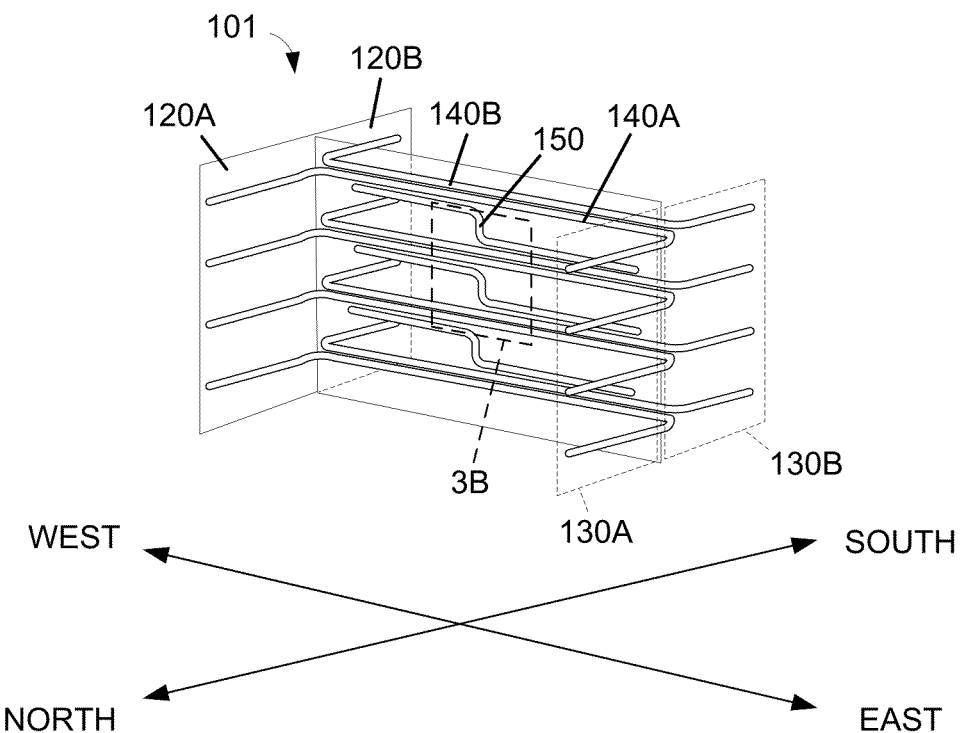
FIG. 3 is a wire-frame view of another embodiment of an EWHTA according to certain aspects of the present disclosure.

FIG. 3 is a wire-frame view of another embodiment 101 of an EWHTA according to certain aspects of the present disclosure. In this view, the two east radiator panels 130A, 130B are shown only in outline so as to reveal the routing of the flexible heat pipes 140. The dashed-line box labeled "3B" is shown in enlarged form in FIG. 6.

It can be seen that, in this embodiment, the flexible heat pipe 140A runs from the north-west radiator panel 120A across the equipment panel 115 and onto the north-east radiator panel 130A and the flexible heat pipe 140B runs from the south-west radiator panel 120B across the equipment panel 115 and onto the south-east radiator panel 130B. In certain embodiments, the flexible heat pipe 140A may be coupled to the south-east radiator panel 130B in place of north-east radiator panel 130A. In certain embodiments, the flexible heat pipe 140B may be coupled to the north-east radiator panel 130A in place of south-east radiator panel 130B. In certain embodiments, a plurality of flexible heat pipes 140 run in parallel from one of the west radiator panels 120A, 120B to one of the east radiator panels 130A, 130B. The EWHTA 101 also includes formed heat pipes 150 mounted on the equipment panel 115. These formed heat pipes serve to couple the various flexible heat pipes 140 so as to, for example, minimize variations in temperature across the equipment panel 115. The configuration and function of these formed heat pipes 150 are discussed in greater detail with respect to FIG. 6.

When a spacecraft that includes an EWHTA 101 or similar, the east and west directions of the spacecraft will point at the Sun once per orbit. At one point in the orbit, the west radiator panels 120A, 120B are directly exposed to the Sun, which has an effective surface temperature of approximately 5800 K (10,000° F.), and the east radiator panels 130A, 130B will be partially exposed to deep space, which has an average temperature of approximately 3 K (−454° F.). The west radiator panels 120A, 120B will absorb radiated energy from the Sun and their temperature will increase, while the east radiator panels 130A, 130B will reject heat to deep space and their temperature will decrease. With reference to a conventional spacecraft 10 of FIG. 1, equipment modules on the west equipment panel 32B that are thermally coupled to only the west radiator panel 30B will be significantly heated by heat transfer from the west radiator panel 30B as the temperature of the west radiator panel 30B exceeds the current temperature of those equipment modules. Equipment modules mounted on the east or west equipment panels 32A, 32B must therefore be able to survive high operational temperatures driven by this absorption of heat from the Sun as there is not alternate source of cooling to offset the heating by the Sun. On the east side of the example spacecraft 10, equipment modules on the east equipment panel 32A, being thermally coupled to only the east radiator panel 30A will be significantly cooled by heat transfer to the west radiator panel 30A as the temperature of the east radiator panel 30A drops toward the temperature of deep space. It is possible to minimize the reduction in the operational temperature of the equipment on the equipment panel 30A while being cooled by deep space by attaching heaters (not shown in FIG. 1 of 2) to either the equipment modules or the equipment panel 30A. The use of such heaters, however, places an additional load on the power system of the spacecraft 10. Even with the heaters, the temperature range between the minimum temperature seen by the equipment modules when their radiator panel is facing toward deep space and the maximum temperature seen when their radiator panel is facing toward the Sun can be quite large and affect, for example, the reliability and performance of the equipment module.

In contrast, a spacecraft with an EWHTA 100 will expose equipment modules coupled to east and west radiators 120A, 120B, 130A, 130B to a smaller temperature range, compared to equipment modules coupled to conventional east and west radiators 30A, 30B on the spacecraft 10. In the example where the west side of the spacecraft is facing toward the Sun, the west radiator panels 120A, 120B heat up due to absorption of heat from the Sun. This absorbed heat, however, is transferred all the way to the east radiation panels 130A, 130B by the flexible heat pipes 140. This direct transfer of heat from the heated west radiator panels 120A, 120B to the cooled east radiation panels 130A, 130B reduces the maximum temperature seen by the west radiator panels 120A, 120B and simultaneously increases the minimum temperature seen by the east radiation panels 130A, 130B while in this orientation to the Sun. The equipment modules that are thermally coupled to the equipment panel 115 will, therefore, see a smaller range of temperatures as the position of the Sun, relative to the spacecraft, moves between the west side and the east side. In addition, the use of heaters to maintain the temperature of the equipment modules above a minimum operational temperature will be reduced, if not eliminated, as the transferred heat from the hot radiation panels, in this example west radiator panels 120A, 120B, to the cold radiation panels, in this example west radiator panels 130A, 130B, will increase the minimum temperature seen by the radiation panels and, therefore, the minimum temperature seen by the equipment modules even in the absence of heaters.

A series of thermal simulations were performed for equipment modules mounted on a conventional east radiator panel 30A, such as shown in FIG. 1 and the same equipment modules mounted on an EWHTA 100. The simulations determined the maximum and minimum temperatures seen by the equipment modules and the amount of additional heater power required to limit the temperature swing of the equipment modules to less than 30° C. (86° F.). Simulations were run for the following cases:

| conditions of simulation | acronym |
|---|---|
| vernal equinox, end-of-life performance | VEEOL |
| summer solstice, beginning-of-life performance | SSBOL |
| autumnal equinox, beginning-of-life performance | AEBOL |
| winter solstice, beginning-of-life performance | WSBOL |

Table 1 lists the predicted minimum and maximum temperatures and the heater power required to maintain the temperature of the equipment modules within the allowable temperature swing. Predicted values that exceed the limits are shown in boldface. In will be apparent that the conventional system allows the maximum temperature of the equipment modules to exceed the maximum limit while still requiring significant heater power during the portion of the orbit while the associated radiator panel 30A, 30B is facing deep space. In contrast, the system of the present disclosure requires only a relatively small amount of heater power and only during the vernal equinox conditions.

TABLE 1

Temperature performance of east-west radiator systems

| Configuration | Analysis case | Min temp (deg C.) | Max temp (deg C.) | Max allowable temp (deg C.) | Diurnal temp swing (deg C.) | Max allowable swing (deg C.) | Heater power required (W) |
|---|---|---|---|---|---|---|---|
| System according to the present disclosure | VEEOL | 52 | 83 | 90 | 32 | 30 | 12 W |
| | SSBOL | 44 | 59 | 90 | 16 | 30 | None |
| | AEBOL | 38 | 62 | 90 | 25 | 30 | None |
| | WSBOL | 57 | 81 | 90 | 25 | 30 | None |
| Conventional design | VEEOL | 47 | 107 | 90 | 62 | 30 | 195 W |
| | SSBOL | 34 | 74 | 90 | 41 | 30 | 66 W |
| | AEBOL | 33 | 76 | 90 | 43 | 30 | 65 W |
| | WSBOL | 46 | 105 | 90 | 59 | 30 | 178 W |

Figure 4:
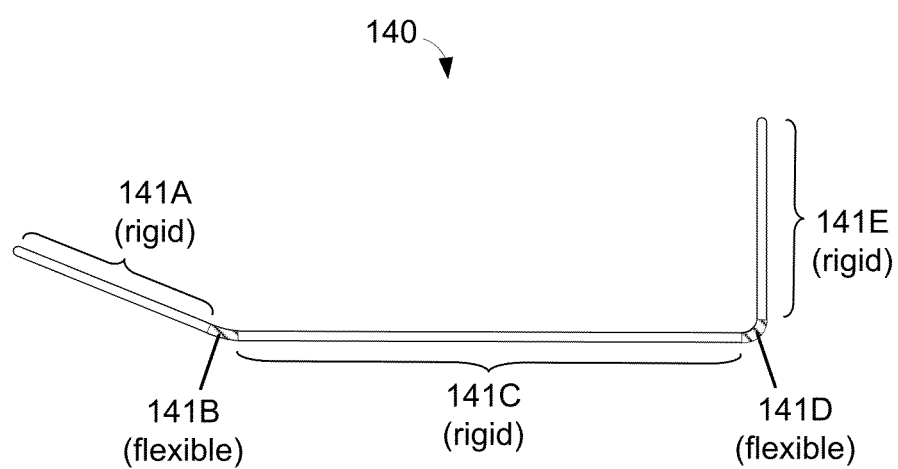
FIG. 4 is a top view of an exemplary flexible heat pipe according to certain aspects of the present disclosure.

FIG. 4 is a top view of an exemplary flexible heat pipe 140 according to certain aspects of the present disclosure. The flexible heat pipe 140 comprises a first rigid tube 141A, a second rigid tube 141C, a third rigid tube 141E, a first flexible tube 141B sealingly coupled between the first and second rigid tubes 141A, 141C, and a second flexible tube 141D sealingly coupled between the second and third rigid tubes 141C, 141E. The first and third rigid tubes 141A, 141E are each closed at an outboard end. The assembly of tubes 141A-141E form a sealed interior volume (not visible in FIG. 4) that contains a heat transfer fluid. In certain embodiments, the flexible heat pipe contains a wick (not visible in FIG. 4) that creates a gas-phase passage and a liquid-phase passage within the interior volume that facilitates the transfer of the liquid-phase heat transfer fluid from the colder portion(s) of the flexible heat pipe 140 to the hotter portion(s) of the flexible heat pipe 140. In certain embodiments, the first and second flexible tubes 141B, 141D are configured such that the adjacent rigid portions 141A and 141C and 141E can be rotated with respect to each other over a range of angles without disconnection of the various elements of the flexible heat pipe 140. In certain embodiments, the rigid tube 141A can be moved over a range of angles with respect to rigid tube 141C. In certain embodiments, rigid tube 141A can be oriented at any angle between 0°, i.e. extending straight out from, and 90° with respect to rigid tube 141C. In certain embodiments, the rigid tube 141A can be moved over a range of −90° to +90° with respect to rigid tube 141C.

Figure 5:
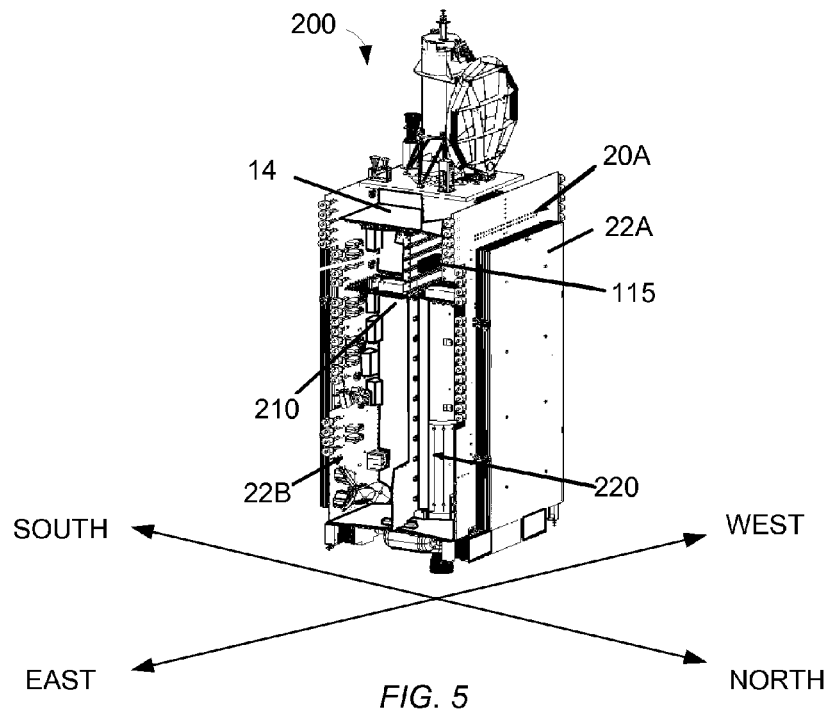
FIG. 5 is a perspective view of an exemplary spacecraft with an EWHTA according to certain aspects of the present disclosure.

FIG. 5 is a perspective view of an exemplary spacecraft 200 with a EWHTA 100 according to certain aspects of the present disclosure. The east radiator panels 130A, 130B have been removed to expose the inner elements of the spacecraft 200. It will be apparent that the central cylinder 220 has been vertically split, compared to the central cylinder 12 of FIG. 1, by the introduction of the equipment panel 115 that extends from the Earth deck 14 downward through the split mid-deck 210.

Figure 6:
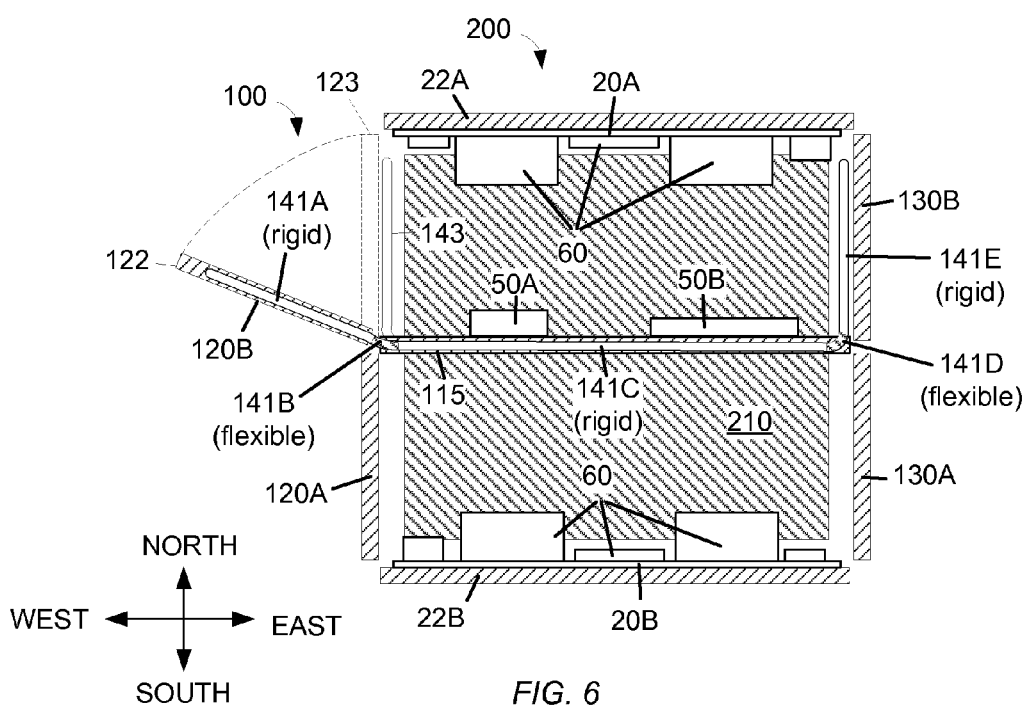
FIG. 6 is a cutaway top view of the spacecraft of FIG. 5 according to certain aspects of the present disclosure.

FIG. 6 is a cutaway top view of the spacecraft 200 of FIG. 5 according to certain aspects of the present disclosure. The view is taken just below the Earth deck 14 and faces downward, with certain elements removed for clarity. The middeck 210 is visible in the middle, with the north and south equipment panels 20A, 20B and north and south radiator panels 22A, 22B positioned at the top and bottom, in the orientation of this view. Various pieces of equipment 60 are mounted to the north and south equipment panels 20A, 20B.

An EWHTA 100 is visible in the middle of the spacecraft 200, with the equipment panel 115 passing left-to-right in this view across the middle of the middeck 210. The north-west radiator panel 120B is shown in an "open" position, with the closed position 122 shown in dashed line. A flexible heat pipe 141 is shown with the rigid tube 141A embedded within the open radiator panel 122, and with the closed position 143 of the same rigid tube 141A shown in dashed line. Representative equipment modules 50A and 50B are shown mounted to the equipment panel 115 and thermally coupled to the rigid tube 141C of the flexible heat pipe 100, which is shown as embedded within the panel 115. Embedding the rigid pipe 141C within the equipment panel 115 may provide greater flexibility in positioning equipment on the panel, as well as the potential to mount equipment to both sides of the equipment panel 115 with equal thermal performance. In certain embodiments, the rigid portions of heat pipe 141 may be mounted to an inner or outer surface of one or more of the radiators 120B, 130B or to one of the surfaces of the equipment panel 115. Mounting the heat pipe on the surface may provide a benefit in manufacture or assembly of the radiators 120B, 130B or equipment panel 115. As an example, the rigid tube 141E is shown as mounted on the inner surface of radiator 130B, for example by bolting and thermally bonding with brackets (not shown in FIG. 6). Other means of thermally coupling the various portions of heat pipe 141 to the respective radiators and panels will be apparent to those of skill in the art. The mounting of equipment modules 50A and 50B is discussed in greater detail with respect to FIG. 7. It will be apparent how the flexible tube 141B, positioned proximate to the hinge of the radiator panel 122, enables the radiator panel 122 to be opened without requiring prior removal of equipment or the flexible heat pipe 141, thus simplifying the process of gaining access to the equipment within the spacecraft 200.

Figure 7:
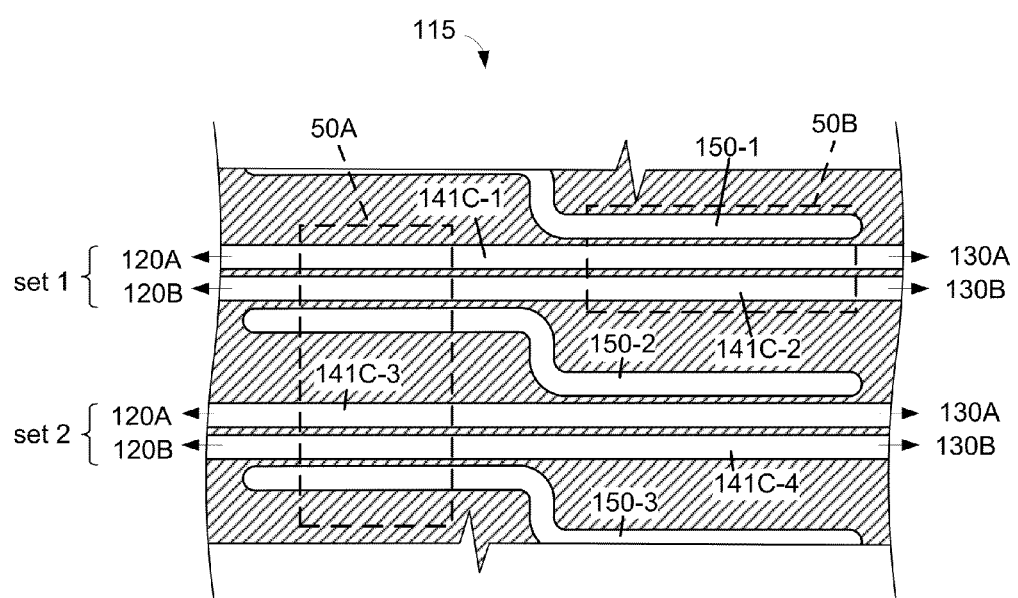
FIG. 7 is an enlarged side view of a portion of equipment panel of the EWHTA of FIG. 5 according to certain aspects of the present disclosure.

FIG. 7 is an enlarged side view of a portion of equipment panel 115 of the EWHTA 100 of FIG. 5 according to certain aspects of the present disclosure. The rigid tubes 141C are shown for multiple flexible heat pipes 141, wherein the nomenclature of "141C-x" indicates individual flexible heat pipes 141. The arrows at the left and right section-lines indicate which radiator panel each line is connected to. For example, the first flexible heat pipe 141, identified as "141C-1" is thermally coupled to north-west radiator panel 120A on the left and to north-east radiator panel 130A on the right. The flexible heat pipes 141 are arranged in pairs, for example flexible heat pipes 141C-1 and 141C-2, which are respectively coupled to the northern and southern of the east and west radiator panels.

The dashed-line boxes 50A and 50B indicate where the representative electronics modules 50A and 50B shown in FIG. 5 are mounted. Electronics module 50A is mounted over, and thermally coupled to, the flexible heat pipes 141C-1, 141C-2, 141C-3, and 141C-4. If the equipment module 50A is considered to be at a uniform temperature across its base, then the equipment module 50A will transfer heat to each of the four flexible heat pipes 141C-1, 141C-2, 141C-3, and 141C-4. This provides redundancy in the event that performance of one of the flexible heat pipes 141 is degraded, for example by loss of the heat transfer fluid in that flexible heat pipe 141. Equipment module 50B is coupled to only two flexible heat pipes 141C-1 and 141C-2. In certain embodiments, the equipment modules 50A and 50B are attached to the support structure of equipment panel 115 and simply held in thermal contact with the rigid tubes 141C of the various flexible heat pipes. In certain embodiments, the equipment modules 50A and 50B may be attached directly to the rigid tubes 141C of one or more of the flexible heat pipes 141. In certain embodiments, additional thermal coupling elements, for example shaped copper straps or thermal grease, may be provided to improve the thermal coupling of the equipment modules 50A, 50B to the respective rigid tubes 141C.

In certain embodiments, formed heat pipes 150 thermally couple one of each pair of flexible heat pipes 141 to one of the adjacent pairs. In this embodiment, a first portion of a formed heat pipe 150-2 is thermally coupled to the flexible heat pipe 141C-2 of one pair and a second portion of the formed heat pipe 150-2 is coupled to flexible heat pipe 141C-3 of an adjacent pair, with a short vertical portion joining the first and second portions. This provides additional redundancy across the plurality of flexible heat pipes 141, in the event that one of the flexible heat pipes 141 fails, and also serves to distribute heat across the EWHTA 100 more evenly. For example, if the equipment module 50B was dissipating a large amount of heat, the flexible heat pipes 141C-1 and 141C-2 would be running hotter than the adjacent heat pipes 141C-3 and 141C-4. The formed heat pipe 150-2 will transfer some of the heat from flexible heat pipe 141C-2 to flexible heat pipe 141C-3, thereby assisting is transferring this heat to the radiator panels 120A, 120B, 130A, 130B.

The disclosed examples of an east-west heat transfer assembly illustrate exemplary configurations wherein heat from spacecraft equipment modules are rejected through east-facing and west-facing radiator panels without subjecting the equipment modules to the temperature extremes or large temperature swings seen with conventional designs. With one of the east and west radiator panels always facing toward deep space, the heat received by the Sun-facing radiator panel is transferred to the other radiator panel and rejected to deep space rather than being transferred into the equipment modules. This provides the additional benefit of reducing or eliminating the need for heater power to maintain the equipment modules within a certain temperature range. While the disclosed configurations include pairs of radiator panels on each of the east and west sides of the spacecraft, it will be apparent to those of skill in the art that the number, size, and location of the radiator panels can be varied without departing from the scope of this disclosure. In addition, the same principles and designs can be applied to the north-facing and south-facing radiator panels of a GEO spacecraft or to a non-orbiting spacecraft to provide easy access to the interior of the spacecraft without prior removal or disassembly of the thermal control system.

This application includes description that is provided to enable a person of ordinary skill in the art to practice the various aspects described herein. While the foregoing has described what are considered to be the best mode and/or other examples, it is understood that various modifications to these aspects will be readily apparent to those skilled in the art, and the generic principles defined herein may be applied to other aspects. It is understood that the specific order or hierarchy of steps or blocks in the processes disclosed is an illustration of exemplary approaches. Based upon design preferences, it is understood that the specific order or hierarchy of steps or blocks in the processes may be rearranged. The accompanying method claims present elements of the various steps in a sample order, and are not meant to be limited to the specific order or hierarchy presented. Thus, the claims are not intended to be limited to the aspects shown herein, but are to be accorded the full scope consistent with the language claims.

Headings and subheadings, if any, are used for convenience only and do not limit the invention.

Reference to an element in the singular is not intended to mean "one and only one" unless specifically so stated, but rather "one or more." Use of the articles "a" and "an" is to be interpreted as equivalent to the phrase "at least one." Unless specifically stated otherwise, the terms "a set" and "some" refer to one or more.

Terms such as "top," "bottom," "upper," "lower," "left," "right," "front," "rear" and the like as used in this disclosure should be understood as referring to an arbitrary frame of reference, rather than to the ordinary gravitational frame of reference. Thus, a top surface, a bottom surface, a front surface, and a rear surface may extend upwardly, downwardly, diagonally, or horizontally in a gravitational frame of reference.

Although the relationships among various components are described herein and/or are illustrated as being orthogonal or perpendicular, those components can be arranged in other configurations in some embodiments. For example, the angles formed between the referenced components can be greater or less than 90 degrees in some embodiments.

Although various components are illustrated as being flat and/or straight, those components can have other configurations, such as curved or tapered for example, in some embodiments.

Pronouns in the masculine (e.g., his) include the feminine and neuter gender (e.g., her and its) and vice versa. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "operation for."

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. A phrase such as an embodiment may refer to one or more embodiments and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

Although embodiments of the present disclosure have been described and illustrated in detail, it is to be clearly understood that the same is by way of illustration and example only and is not to be taken by way of limitation, the scope of the present invention being limited only by the terms of the appended claims.

What is claimed is:

1. A heat transfer assembly for a spacecraft, comprising:
   an equipment panel having an east end and a west end;
   an east radiator panel coupled to the east end of the equipment panel;
   a west radiator panel coupled to the west end of the equipment panel; and
   a plurality of flexible heat pipes each comprising a first rigid tube thermally coupled to the east radiator panel, a second rigid tube coupled to the equipment panel, a third rigid tube thermally coupled to the west radiator panel, a first flexible tube sealingly coupled between the first and second rigid tubes, and a second flexible tube sealingly coupled between the second and third rigid tubes,
   wherein the equipment panel is configured to retain one or more equipment modules in thermal contact with the second rigid tube of at least one of the plurality of flexible heat pipes.

2. The heat transfer assembly of claim 1, wherein:
   each of the plurality of flexible heat pipes comprises:
     a sealed first internal volume formed by the respective first, second, and third rigid tubes and the first and second flexible tubes; and
     a first heat transfer fluid disposed within the first internal volume; and the first and third rigid tubes of each of the plurality of flexible heat pipes are each capable of condensing the first heat transfer fluid from a vapor to a liquid by rejecting heat to the respective east and west radiator panels.

3. The heat transfer assembly of claim 2, wherein the second rigid tube of each of the plurality of flexible heat pipes is capable of evaporating the first heat transfer fluid from a liquid to a vapor by accepting heat from one or more equipment modules thermally coupled to the second rigid tube.

4. The heat transfer assembly of claim 2, wherein the first and third rigid tubes of each of the plurality of flexible heat pipes are each capable of evaporating the first heat transfer fluid from a liquid to a vapor by accepting heat from the respective east and west radiator panels.

5. The heat transfer assembly of claim 1, further comprising a plurality of formed heat pipes each comprising a first portion thermally coupled to the second rigid tube of a first flexible heat pipe, a second portion thermally coupled to the second rigid tube of a second flexible heat pipe and a third portion sealingly coupled between the first and second portions.

6. The heat transfer assembly of claim 5, wherein each of the plurality of formed heat pipes is capable of transferring heat from the hotter of the first and second flexible heat pipes to the colder of the first and second flexible heat pipes.

7. The heat transfer assembly of claim 5, wherein:
each of the plurality of formed heat pipes further comprises a sealed second interior volume formed by the first, second, and third portions of the respective formed heat pipe and a second heat transfer fluid disposed within the second internal volume;
each of the first and second portions is capable of evaporating the heat transfer fluid from a liquid to a vapor by accepting heat from the respective flexible heat pipe when the respective flexible heat pipe is the hotter of the first and second flexible heat pipes; and
each of the first and second portions is capable of condensing the heat transfer fluid from a vapor to a liquid by rejecting heat to the respective flexible heat pipe when the respective flexible heat pipe is the colder of the first and second flexible heat pipes.

8. The heat transfer assembly of claim 1, wherein at least one of the east and west radiator panels is hingedly coupled to the equipment panel such that the at least one of the east and west radiator panels can be rotated with respect to the equipment panel.

9. The heat transfer assembly of claim 1, wherein the east and west radiator panels are rotatably coupled to the respective east and west ends of the equipment panel.

10. A spacecraft, comprising:
a core structure;
an east-west equipment panel having an east end and a west end;
an east radiator panel rotatably coupled to the east end of the equipment panel;
a west radiator panel rotatably coupled to the west end of the equipment panel;
a plurality of flexible heat pipes each comprising a first rigid tube thermally coupled to the east radiator panel, a second rigid tube coupled to the equipment panel, a third rigid tube thermally coupled to the west radiator panel, a first flexible tube sealingly coupled between the first and second rigid tubes; and a second flexible tube sealingly coupled between the second and third rigid tubes; and
one or more equipment modules thermally coupled to the second rigid tube of at least one of the plurality of flexible heat pipes.

11. The spacecraft of claim 10, wherein:
each of the plurality of flexible heat pipes comprises a sealed first internal volume formed by the respective first, second, and third rigid tubes and the first and second flexible tubes and a first heat transfer fluid disposed within the first internal volume; and
the first and third rigid tubes of each of the plurality of flexible heat pipes are each capable of condensing the first heat transfer fluid from a vapor to a liquid by rejecting heat to the respective east and west radiator panels.

12. The spacecraft of claim 11, wherein the second rigid tube of each of the plurality of flexible heat pipes is capable of evaporating the first heat transfer fluid from a liquid to a vapor by accepting heat from one or more equipment modules thermally coupled to the second rigid tube.

13. The spacecraft of claim 11, wherein the first and third rigid tubes of each of the plurality of flexible heat pipes are each capable of evaporating the first heat transfer fluid from a liquid to a vapor by accepting heat from the respective east and west radiator panels.

14. The spacecraft of claim 10, further comprising a plurality of formed heat pipes each comprising a first portion thermally coupled to the second rigid tube of a first flexible heat pipe, a second portion thermally coupled to the second rigid tube of a second flexible heat pipe and a third portion sealingly coupled between the first and second portions.

15. The spacecraft of claim 14, wherein each of the plurality of formed heat pipes are capable of transferring heat from the hotter of the first and second flexible heat pipes to the colder of the first and second flexible heat pipes.

16. The spacecraft of claim 14, wherein:
each of the plurality of formed heat pipes further comprises a sealed second interior volume formed by the first, second, and third portions of the respective formed heat pipe and a second heat transfer fluid disposed within the second internal volume;
each of the first and second portions is capable of evaporating the heat transfer fluid from a liquid to a vapor by accepting heat from the respective flexible heat pipe when the respective flexible heat pipe is the hotter of the first and second flexible heat pipes; and
each of the first and second portions is capable of condensing the heat transfer fluid from a vapor to a liquid by rejecting heat to the respective flexible heat pipe when the respective flexible heat pipe is the colder of the first and second flexible heat pipes.

17. The spacecraft of claim 10, wherein at least one of the east and west radiator panels is hingedly coupled to the equipment panel such that the at least one of the east and west radiator panels can be rotated to provide access to the one or more equipment modules.

18. A method of controlling the temperature of an equipment module on a spacecraft, the method comprising the step of:
thermally coupling the equipment module to a flexible heat pipe that comprises a first rigid tube thermally coupled to an east radiator panel disposed on an external east surface of the spacecraft, a second rigid tube thermally coupled to a west radiator panel disposed on an external west surface of the spacecraft, and a third rigid tube coupled to the first and second rigid tubes by first and second flexible tubes, respectively, wherein the equipment module is thermally coupled to the third rigid tube.

19. The method of claim 18, further comprising the steps of:
moving one of the east and west radiator panels from a closed position to an open position such that the respective one of the first and second flexible tubes bends to maintain the integrity of the flexible heat pipe;
attaching the equipment module to an equipment panel that is coupled to the third rigid tube; and
moving the one of the east and west radiator panels from the open position to the closed position.

* * * * *